(12) United States Patent
    Racine

(10) Patent No.: US 9,414,294 B2
(45) Date of Patent: Aug. 9, 2016

(54) METHOD FOR DECOUPLING CALLER ROUTING SERVICES AND OFF-NET DATA ACQUISITION

(71) Applicant: 800 RESPONSE INFORMATION SERVICES LLC, Burlington, VT (US)

(72) Inventor: Matthew Racine, Colchester, VT (US)

(73) Assignee: 800 RESPONSE INFORMATION SERVICES LLC, Burlington, VT (US)

( * ) Notice: Subject to any disclaimer, the term of this patent is extended or adjusted under 35 U.S.C. 154(b) by 0 days.

(21) Appl. No.: 14/317,509

(22) Filed: Jun. 27, 2014

(65) Prior Publication Data

US 2015/0031373 A1    Jan. 29, 2015

Related U.S. Application Data

(60) Provisional application No. 61/858,356, filed on Jul. 25, 2013.

(51) Int. Cl.

| | | |
|---|---|---|
| *H04W 40/00* | (2009.01) | |
| *H04W 40/20* | (2009.01) | |
| *H04W 4/02* | (2009.01) | |
| *H04M 3/00* | (2006.01) | |
| *H04W 76/02* | (2009.01) | |
| *H04W 4/16* | (2009.01) | |
| *H04L 29/08* | (2006.01) | |

(52) U.S. Cl.
   CPC .............. *H04W 40/20* (2013.01); *H04M 3/00* (2013.01); *H04W 4/023* (2013.01); *H04W 76/022* (2013.01); *H04L 67/18* (2013.01); *H04W 4/02* (2013.01); *H04W 4/16* (2013.01)

(58) Field of Classification Search
   USPC .......................................... 455/445
   See application file for complete search history.

(56) References Cited

U.S. PATENT DOCUMENTS

| 7,493,125 B2* | 2/2009 | Nagesh .................. H04M 3/02 455/414.2 |
|---|---|---|
| 8,731,515 B2* | 5/2014 | Muhonen ................ H04W 4/22 340/286.06 |
| 2006/0121904 A1* | 6/2006 | Reuhkala ................ H04W 8/06 455/445 |
| 2010/0029272 A1* | 2/2010 | McCann ................ H04W 4/16 455/433 |

* cited by examiner

*Primary Examiner* — Joel Ajayi
(74) *Attorney, Agent, or Firm* — Greenblum & Bernstein, P.L.C.

(57) ABSTRACT

Call routing system and method for routing calls based upon a calling party's location. The call routing system includes a communication interface structured and arranged to receive an incoming call, a routing network interface structured and arranged to route the incoming call to a termination point based upon a current location of the calling party, a location based service interface through which a query is transmitted to a location based service to request location data associated with the current location and through which a response including the location data is received from the location based service, and a processor structured and arranged to execute instructions to route the incoming call to a closest termination point to the current location based on the location data. The calling party's call does not originate over a land line device.

19 Claims, 10 Drawing Sheets

METHOD FOR DECOUPLING CALLER ROUTING SERVICES AND OFF-NET DATA ACQUISITION

CROSS-REFERENCE TO RELATED APPLICATION

The instant application claims the benefit under 35 U.S.C. §119(e) of U.S. Provisional Application No. 61/858,356 filed Jul. 25, 2013, the disclosure of which is expressly incorporated by reference in its entirety.

BACKGROUND OF THE INVENTION

1. Field of the Invention

Embodiments of the present invention pertain to a system and method for properly routing telephone calls made by callers using the public telecommunications network. Specifically, embodiments relate to a method for incorporating a commercial location and data services that reside on remote computer networks and are available only via so-called web services, into an interactive voice response system to provide superior call routing and caller abandon rates.

2. Discussion of Background Information

The workhorse of the public telecommunications network, plain old telephone service (POTS) has historically been highly geographic in nature: every POTS number is essentially tied to a loop of copper from the local telephone company facility to its subscribers' homes or offices. The original design of the landline network, together with the rules used to assign telephone numbers to these facilities, resulted in a dependable and reasonably accurate correlation between a caller's telephone number and their physical, geographic location.

Many businesses still rely upon this correlation in order to properly handle inbound calls using special techniques to route callers to the geographically closest office, store or service location. In addition, some businesses require the caller's location in order to determine the appropriate interactive voice response (IVR) treatment, i.e., direct termination, call-prompt, county-routing, etc. The location of the caller is inferred by cross-referencing the area code and exchange of the caller's telephone number with telecommunications databases which give the geographic location of the local telephone company's facility that provides service to the caller.

Such databases are readily available from a number of sources, e.g. Telcordia Technology's "Local Exchange Routing Guide"; these databases are normally uploaded to a data storage and retrieval facility which is housed close to the equipment used to route calls, and are accessible via an internal local area network; such databases are said to be "on-net". In general, on-net assets reside on high performance hardware and networks, with very low levels of latency and errors. Call routing services use on-net databases to determine the appropriate service location for a given inbound call.

Several factors have combined to significantly erode the correlation between caller's telephone numbers and their geographic location. Most notable is the proliferation of mobile telephones, which surpassed landline telephones in 2005; by 2013, more than one-third of Americans relied solely on their mobile phone, and a mobile phone was the primary telephone in more than half of US households. Although some of these devices are used within their original area codes' service areas, rarely are they used exclusively at the subscribers' homes, and frequently they're used outside their original area codes' service areas.

In addition, changes in the way blocks of new telephone numbers are assigned to telecommunications carriers, including wireless carriers, and especially those carriers whose networks are based on "voice over IP" (VoIP) technology, and a de facto loosening of the rules used to assign numbers to underlying facilities, have also served to compromise the correlation between telephone number and inferred location.

All of these factors have combined to make it increasingly problematic to provide proper routing for inbound telephone calls.

Since the nature of wireless telecommunications requires that wireless carriers know the physical location of mobile devices, wireless carriers have designed and built the appropriate location technologies into their wireless communications networks and control systems. Wireless carriers have leveraged these capabilities to offer a variety of so-called "location-based services" (LBS) directly to their own subscribers; they also offer access to their networks' location platforms to qualified aggregators. These aggregators function as a clearinghouse, providing a wide range of value-added services that seamlessly span a number of disparate wireless carriers. For example, Syniverse is a location-based service provider, offering access to the latitude and longitude of a number of wireless carriers' mobile subscribers, via real-time queries and common web-based application objects, over the public internet. Due to the fact that this information is derived from network telemetry in real-time, it can only be accessed remotely.

Access to other telecommunications databases is readily available; such databases contain a range of information about telephone numbers, including billing addresses. For example, AT&T's "Information Retrieval Service" provides a wide variety of information about a given telephone number, and Neustar's "Power Port Search" provides access to a number of authoritative telecommunications databases—again, via real-time queries and common web-based application objects, over the public internet. Due to the size, complexity, fluidity, and proprietary nature of these databases, it is not feasible that they would be downloaded to others' platforms—they are only accessible remotely, via the technologies described above.

Such remotely accessible real-time information and databases are said to be "off-net". In general, off-net assets tend to have a very different performance profile: retrieval times are often measured in seconds, as opposed to milliseconds; for example, the time required to derive the location of a mobile caller can vary from 4 to 16 seconds. Error rates can also be orders of magnitude higher; whereas an on-net database might have an error rate of $10^{-8}$, the figure for an off-net service could reasonably be $10^{-2}$.

The difference between on-net and off-net performance figures is all the more critical in light of the abandon rates for calls processed by IVRs, which tend to rise dramatically the longer a caller must wait for their call to be routed.

What is wanted, then, is a technique that allows the IVR to manage a caller's telephone experience independently of the off-net application gateways' performance characteristics—a technique that affords call routing services the ability to interact with off-net providers to obtain critical routing data, while at the same time retaining the flexibility to manage that interaction using best practices for interactive voice response.

Note that although networks and systems based on E911 technologies are indeed capable of routing calls based on location, these algorithms are entirely unsuited for commercial use, due to the length of time required to route the call. Emergency callers have no alternative but to wait up to 30-45 seconds for the network to resolve their location; it is common experience that someone calling in response to a billboard, print or radio advertisement would abandon the call in a small fraction of this time.

SUMMARY OF THE EMBODIMENTS

For the purpose of this invention, an "Interactive Voice Response unit" (IVR) is a computer controlled system, which can be a collection of computer hardware and software, that accepts incoming telephone calls and routes said telephone calls.

For the further purpose of this invention, "routing a telephone call" refers to the execution of the appropriate voice prompts and computer algorithms in conjunction with database tables and application gateways of other, e.g., third party, service providers to determine the service location to which an incoming telephone call should be delivered.

For the further purpose of this invention, an "inbound telephone call" refers to the event of a telephone subscriber placing a call, and subsequent presentation of that call to the telecommunications carrier which has ultimate responsibility for routing the call to the proper service location.

For the further purpose of this invention, "application gateway web services" refers to commercial information services that are accessible over internet protocol-based networks via web application programming interfaces (APIs) built around Simple Object Application Protocols (SOAP), which rely on Extensible Markup Language (XML) for message format and the Hypertext Transmission Protocol (HTTP) for message negotiation and transmission.

For the further purpose of this invention, "request payload" refers to the collection of information necessary to make a complete and well-formed query to an application gateway's web service; "response payload" refers to the collection of information returned from the gateway in response to such queries.

Since callers expect calls to be routed quickly, and since application gateways have distinct performance and latency profiles which are significantly less predictable than local data stores and can vary over time within and across gateways, it is a further aspect of this invention to provide a method to allow an IVR to avail itself of a separate software agent to mediate the interaction between the IVR program execution and the third parties' application gateways' web services, essentially decoupling the callers' telephone experience from the gateways' performance.

It is a further aspect of this invention to provide a technique whereby, if an inbound call cannot be successfully routed, the IVR will send the call to a call center to be routed manually, or will simply route the call on the basis of the location attributes of the caller's telephone number itself.

It is a further aspect of this invention to provide a method whereby, after having obtained a caller's location data, e.g., latitude and longitude coordinates, from an application gateway web service, the IVR can translate that data, e.g., coordinates, into other pertinent location attributes which may be required in order to properly route the call, e.g., telephone area code and exchange, zip code, and county.

Embodiments of the invention are directed to a call routing system for routing calls based upon a calling party's location. The call routing system includes a communication interface structured and arranged to receive an incoming call, a routing network interface structured and arranged to route the incoming call to a termination point based upon a current location of the calling party, a location based service interface through which a query is transmitted to a location based service provider to request location data associated with the current location and through which a response including the location data is received from the location based service provider, and a processor structured and arranged to execute instructions to route the incoming call to a closest termination point to the current location based on the location data. The calling party's call does not originate over a land line device.

According to embodiments of the invention, the call routing system may include an interactive call response unit structured and arranged to include the communication interface and the routing network interface.

In accordance with other embodiments, the call routing system can include a database storing a plurality of sounds and a processor that transmits at least some of the plurality of sounds to the calling party in a time period between the query transmission to and the query response from the location based service provider. The processor can execute the plurality of sounds in a predetermined order for transmission to the calling party.

According to embodiments of the instant invention, the query may be is transmitted to the location based service provider over an internet protocol based network. The query to be transmitted can include a request identifier and a request payload. Moreover, the query received may include the request identifier and a response payload. Further, a gateway mediation service can be coupled to the location based service interface and may be configured to create a new service request for the query to be transmitted. The new service request can create a child process which receives the query received from the location based service provider. In this way, receipt of the new service request by the gateway mediation service's parent process can create a child process that transmits the request query to the location based service interface and subsequently receives a response from the location based service provider.

In accordance with other embodiments, the location data may include at least a latitude and longitude for the current location. The instructions executed by the processor may include instructions to convert the latitude and longitude of the current location to at least one of: an area code and exchange; a zip code; and a county.

According to further embodiments, the call routing system can be configured as an intermediary between the calling party and the termination point until the call is ended.

Further, a call originating from the calling party may be directed to a toll free number associated with an entity having multiple locations.

In accordance with still other embodiments of the invention, the incoming call may originate from one of a cell phone, voice over IP system, or the Internet.

Embodiments of the invention are directed to a method for routing calls based upon a calling party's location. The method includes receiving an incoming call from a calling party not originating from a land line device, the incoming call being directed to a number associated with a plurality of entities situated at different locations, determining a current location of the calling party, and routing the incoming call for termination to a selected one of the plurality of entities which is situated closest to the current location.

In embodiments, the determining of the current location may include transmitting a query to a location based service provider requesting location data for the current location, and receiving a response from the location based service provider that includes the location data for the current location. The method can also include, at least during a period between the transmitting of the query and the receiving of the response, playing a plurality of sounds in a predetermined order to the calling party. The received location data can include data points in a coordinate system, and the method may further include converting the data points to at least one of: an area code and exchange; a zip code; and a county.

In accordance with yet other embodiments of the present invention, the method can be executed at least in part by a processor in a call routing system configured as an intermediary between the calling party and the termination point until the call is ended.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
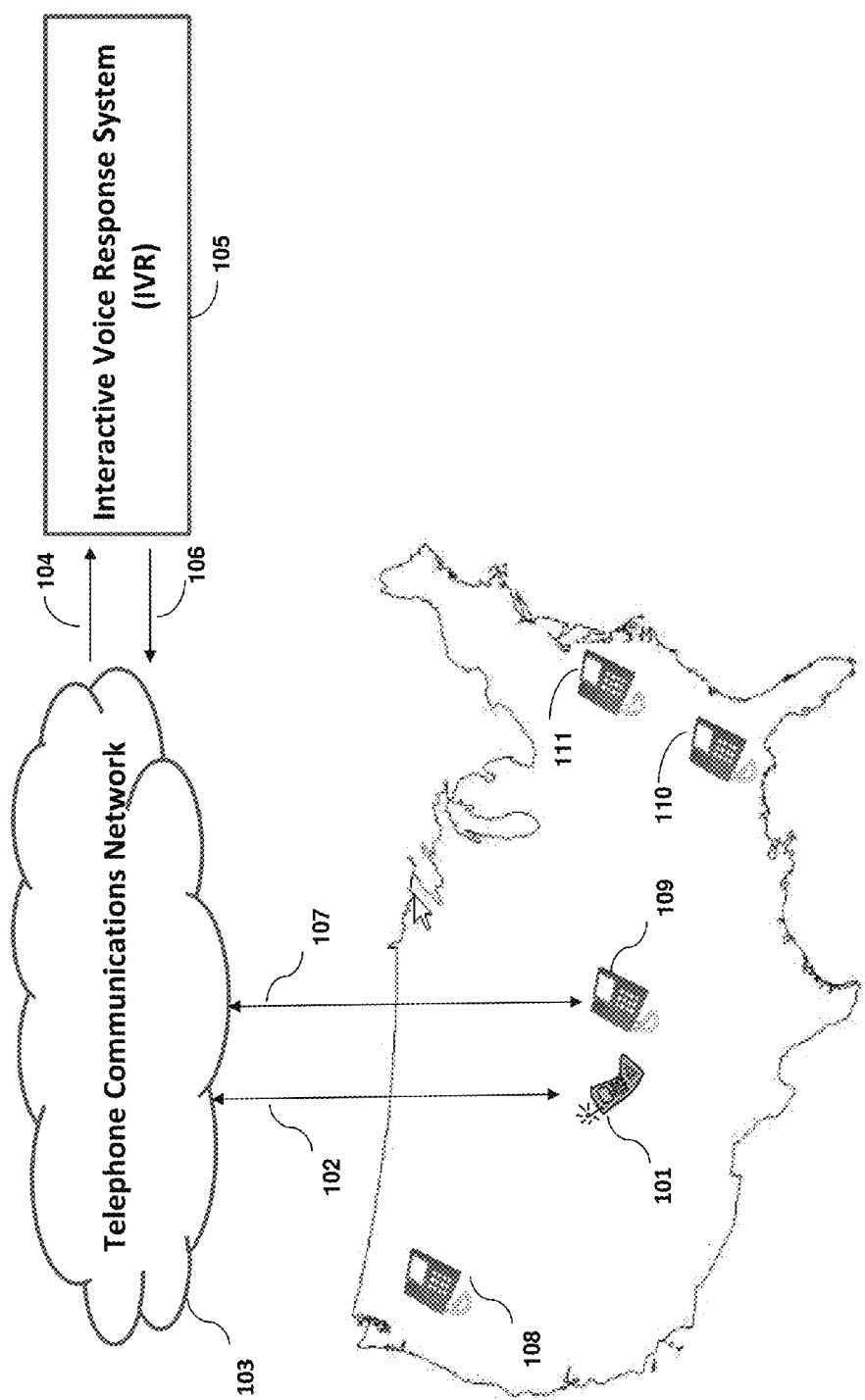
FIG. 1 illustrates a connection of an incoming call to a termination point via an interactive voice response (IVR) system.

FIG. 1 illustrates a subscriber 101 making an inbound call 102 to a telephone number they want to reach (i.e., the "wanted number") via the telephone communications network 103, delivery of that call 104 to an interactive voice response unit (IVR) which determines the proper termination point from among numerous possibilities 108 through 111, and finally a separate outbound call 106, termination of that call to the appropriate service location 109, at which point the two legs 104 and 106 are bridged in the IVR 105.

Figure 2:
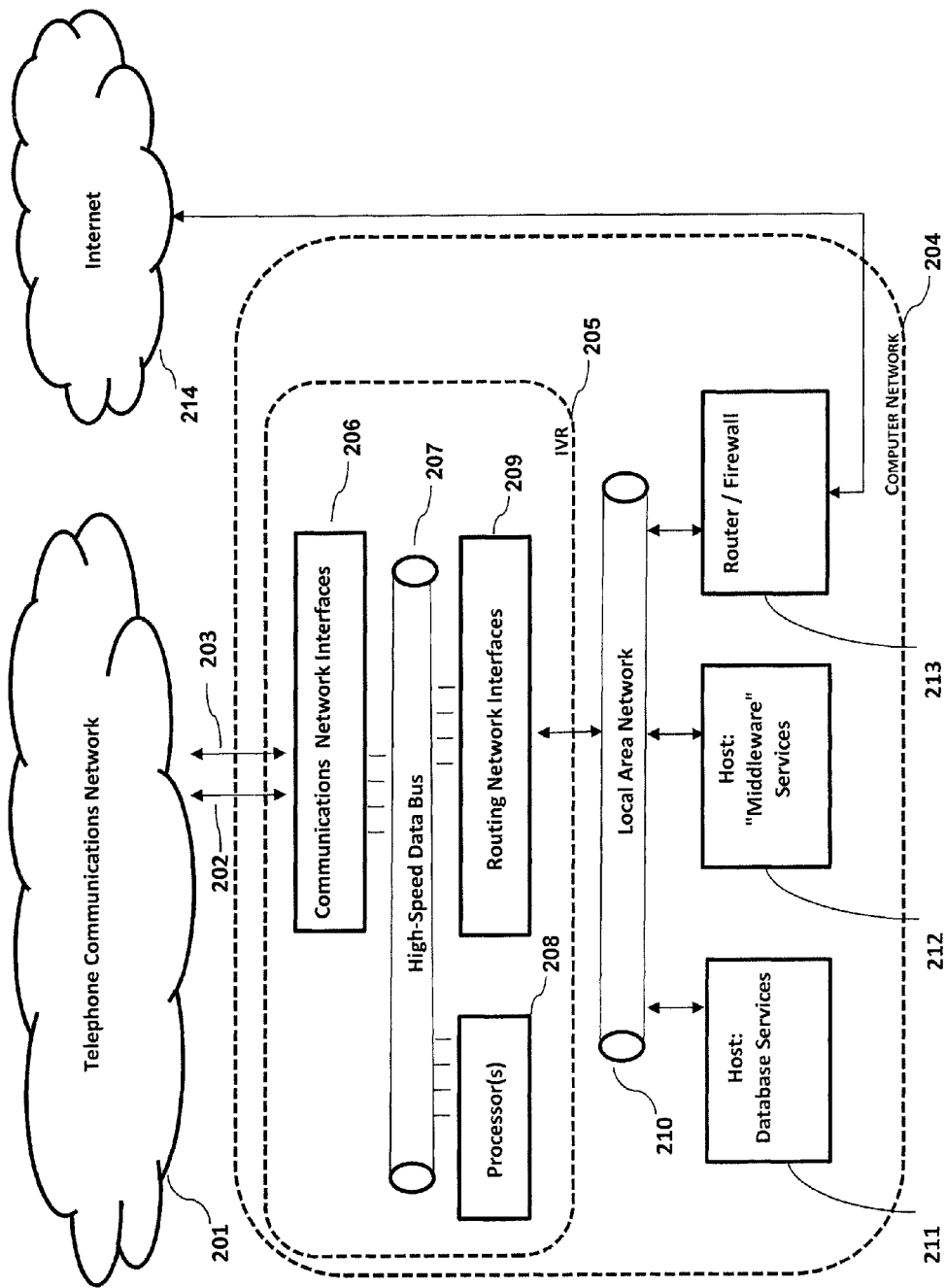
FIG. 2 schematically illustrates the structure of the IVR.

FIG. 2 is a schematic diagram showing an IVR and computer network which could be used to host a representative instance of the invention. The Telephone Communications Network 201 sends inbound calls 202 from subscribers to the IVR, and accepts outbound calls 203 to the appropriate service location; the IVR and computer network 204 are comprised of the IVR 205 described below, a local area data network 210 which provides internet-protocol (IP)-based communications to other host computers in the platform, which host database servers 211 and middleware servers 212, as well as access to the Internet 214 via a router and/or firewall 213. The IVR 205 is comprised of communications network interfaces 206 which provide the digital signaling processing circuitry required to interoperate with the telecommunications network, logic processors 208 comprising one or more computer central processing units, computer memory, and various software used to provide basic operating system services and call-routing application logic, routing network interfaces 209 used to provide access to other platform components, and a high-speed data bus 207 used to interconnect the IVR's components.

Figure 3:
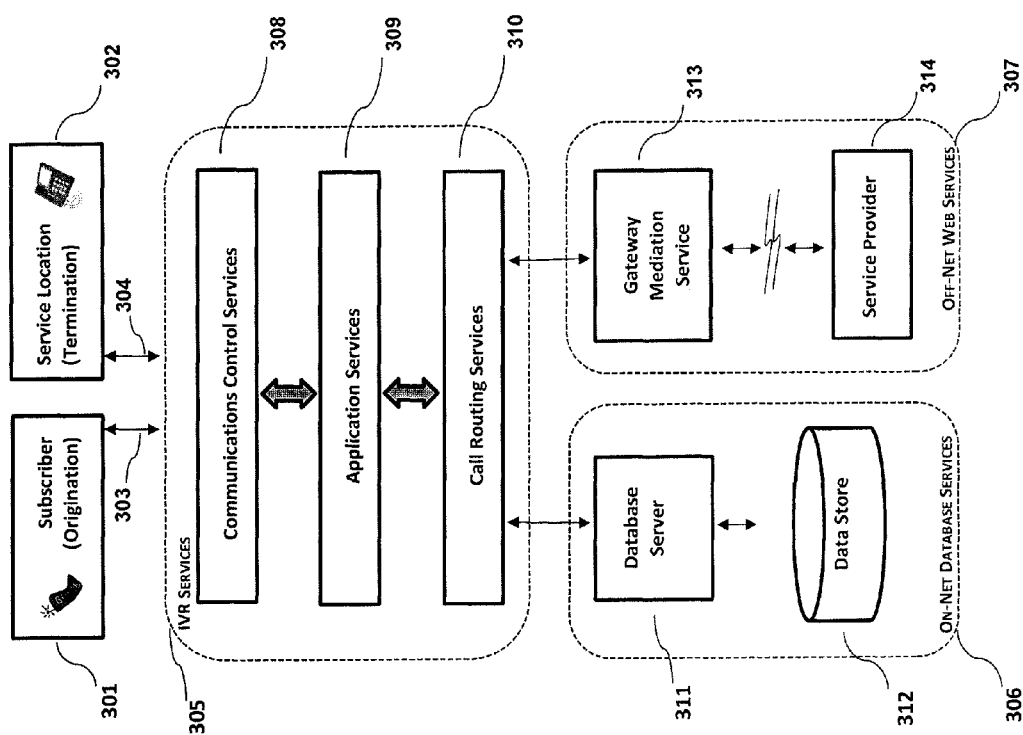
FIG. 3 illustrates the functional features of the IVR.

FIG. 3 is a schematic diagram showing the service components used by the IVR to route calls. Subscriber 301 makes an inbound call 303; three separate sets of services are then brought into play to deliver that call to the proper service location 302: IVR Services 305 run on the IVR host computer, and are comprised of a) communications control services 308 to provide basic telephonic services such as answering calls, making calls, bridging and managing calls, b) applications services 309 to handle the interactions with the caller, if any, including playing voice prompts and gathering keypad or spoken input from the caller that is necessary for determining how to route the call, and c) call routing services 310 to derive the proper service location and termination point 302. The IVR Services 305 then make a separate outbound call 304 to that termination point 302 and finally bridge the two calls 303 and 304 at the IVR's communications network interface.

On-net database services 306 are used by call routing services 310 via master routing table queries directed to a database server 311, which retrieves information from tables in local database stores 312. Off-net web services 307 are also used by call routing services 310 via queries to off-net service providers 314, however, due to the operational characteristics of such web services (e.g., higher and much more variable latency and error rates), a gateway mediation service 313 is wanted to ensure that call routing decisions are made timely.

Figure 4:
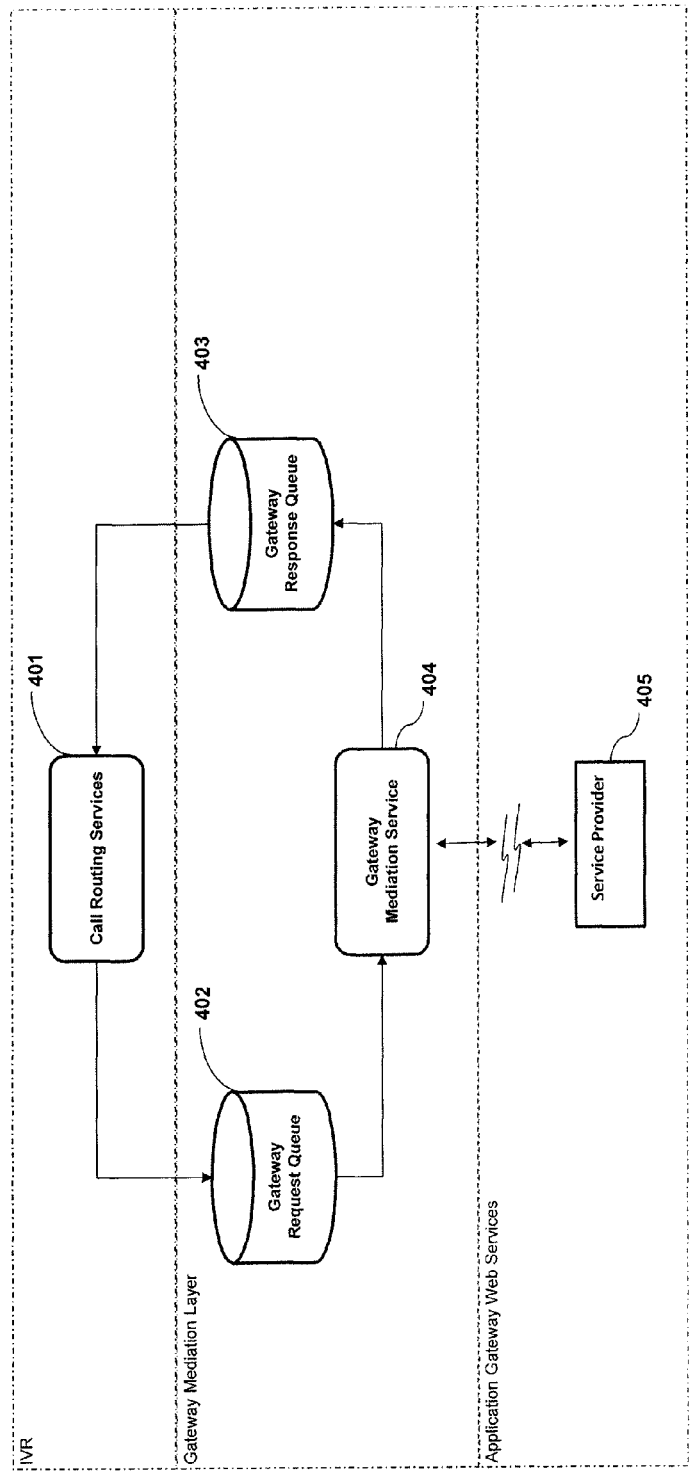
FIG. 4 schematically illustrates a gateway mediation layer to decouple call routing services from a service provider.

FIG. 4 is a schematic diagram showing a procedure flow between IVR call routing services 401 and the gateway mediation layer "middleware" by which IVR Call Routing Services are decoupled from the off-net service providers' application gateways' web services. In lieu of making a direct off-net query, call routing services 401 instead place requests in a gateway request queue 402 and look for response in gateway response queue 403. The gateway mediation service 404, running on either the IVR or another host under any modern server-based operating system, examines each request and, if timely, asserts an application gateway web service request to the service provider 405 and awaits a reply, which is finally stored in the gateway response queue 403. In the preferred embodiment for this invention, the gateway mediation service would run on a dedicated host, under Windows 2008 Server operating system or a more recent release.

Figure 5:
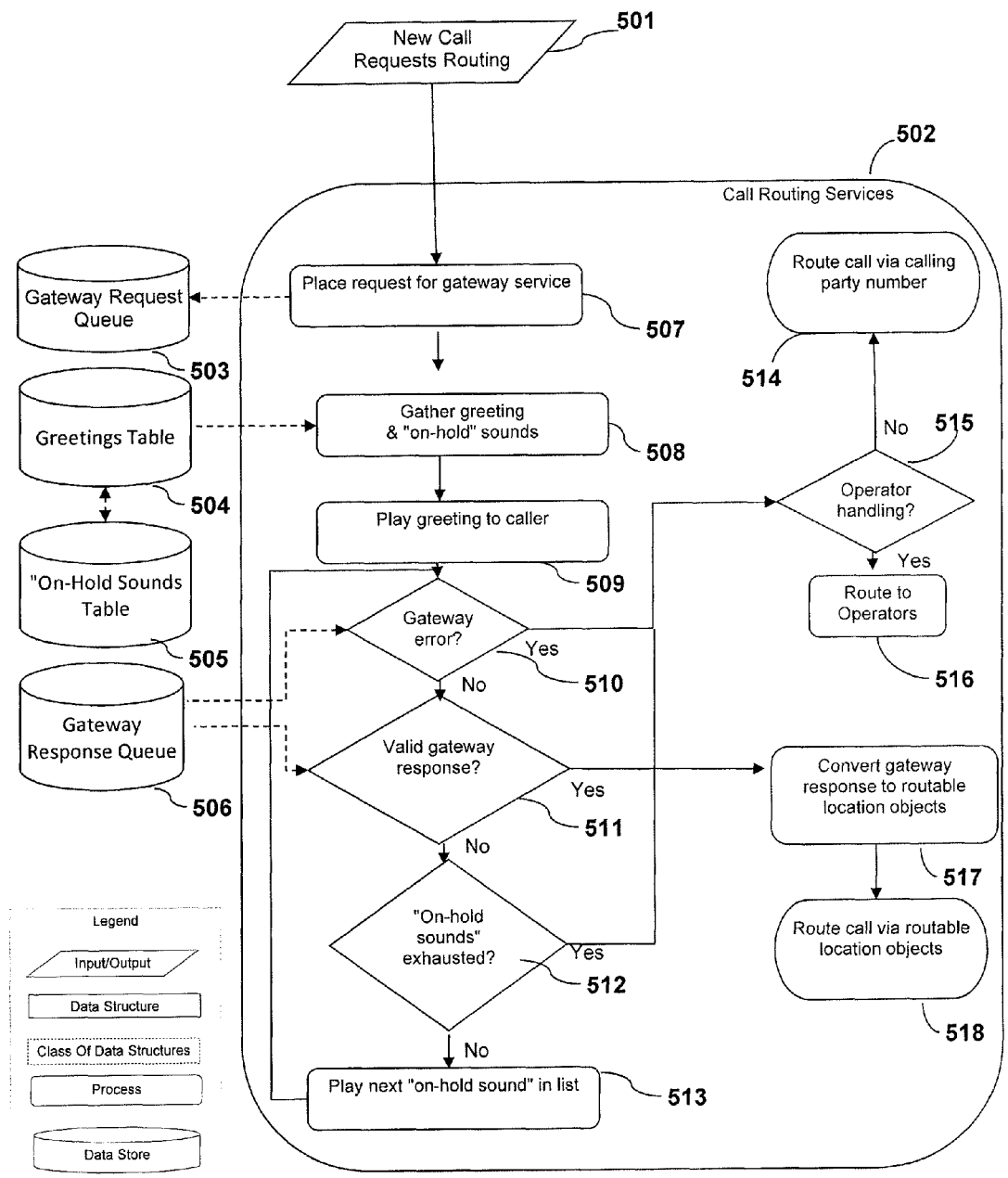
FIG. 5 illustrates a flow diagram of an embodiment of the request and receipt of location data.

FIG. 5 is a procedural flowchart showing the technique used by the IVR's call routing services to isolate incoming callers' real-time interactions with the IVR from the wide range of latency and errors inherent in the operations of the applications gateways' web services, in order to minimize the length of time callers must wait for calls to be routed. The call routing service will generate a high volume of transactions per unit time in checking the gateway response queue in 510 and 511, which dictates that the queue be memory-based; a preferred embodiment is a Windows private event queue. The greetings table 504 contains a single record associated with each wanted number; each record contains a pointer to an audio file that contains a greeting which the IVR will play to the caller when it answers a call to that wanted number, and a pointer to a plurality of related records in the "on-hold sounds" table 505; each record in the "on-hold sounds" table contains an identifying key, a pointer to an audio file containing an "on-hold sound" fragment, and a sequence number. A group of records in table 505 that share a common identifying key will specify the sounds which the IVR will play to the caller 513 and the sequence in which the sounds will be played.

Figure 6:
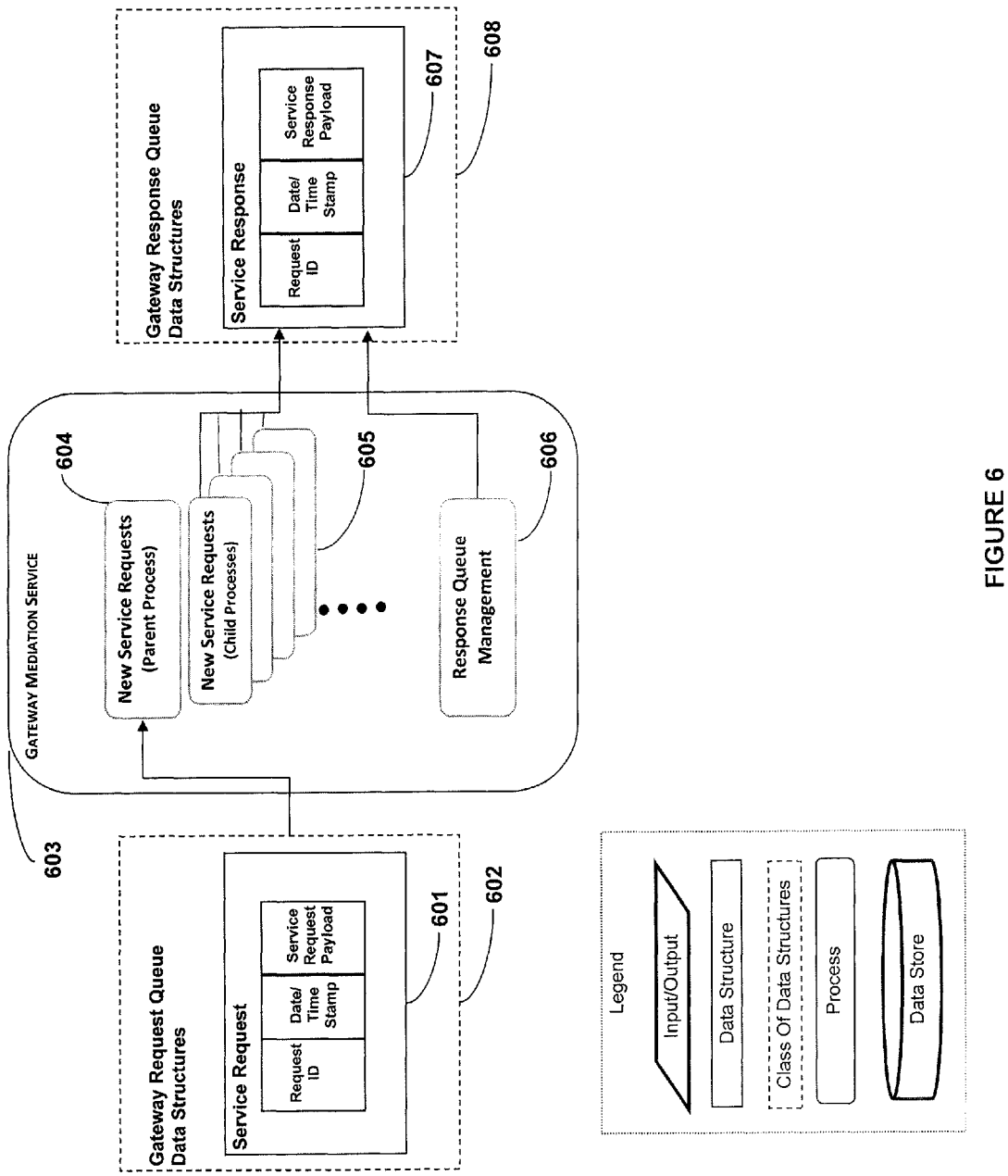
FIG. 6 illustrates functional features of the gateway mediation service.

FIG. 6 is a schematic diagram showing the internal structures 601 and 607 of the gateway request queue 602 and gateway response queue 608, respectively, and their relationship to the components of the gateway mediation service 603. The parent process 604 awaits the arrival of new requests, creates new child processes 605 for each such request on a "first-in, first-out" basis; each child processes 605 builds and submits the appropriate application gateway SOAP-based web service request, which requests are comprised of XML messages containing the requestor's credentials and queries that conform to the syntax of the gateway's specific application programming interface. After submitting such a request, a given child process 605 then awaits a reply from the application gateway, and files the reply in the gateway response queue.

Figure 7:
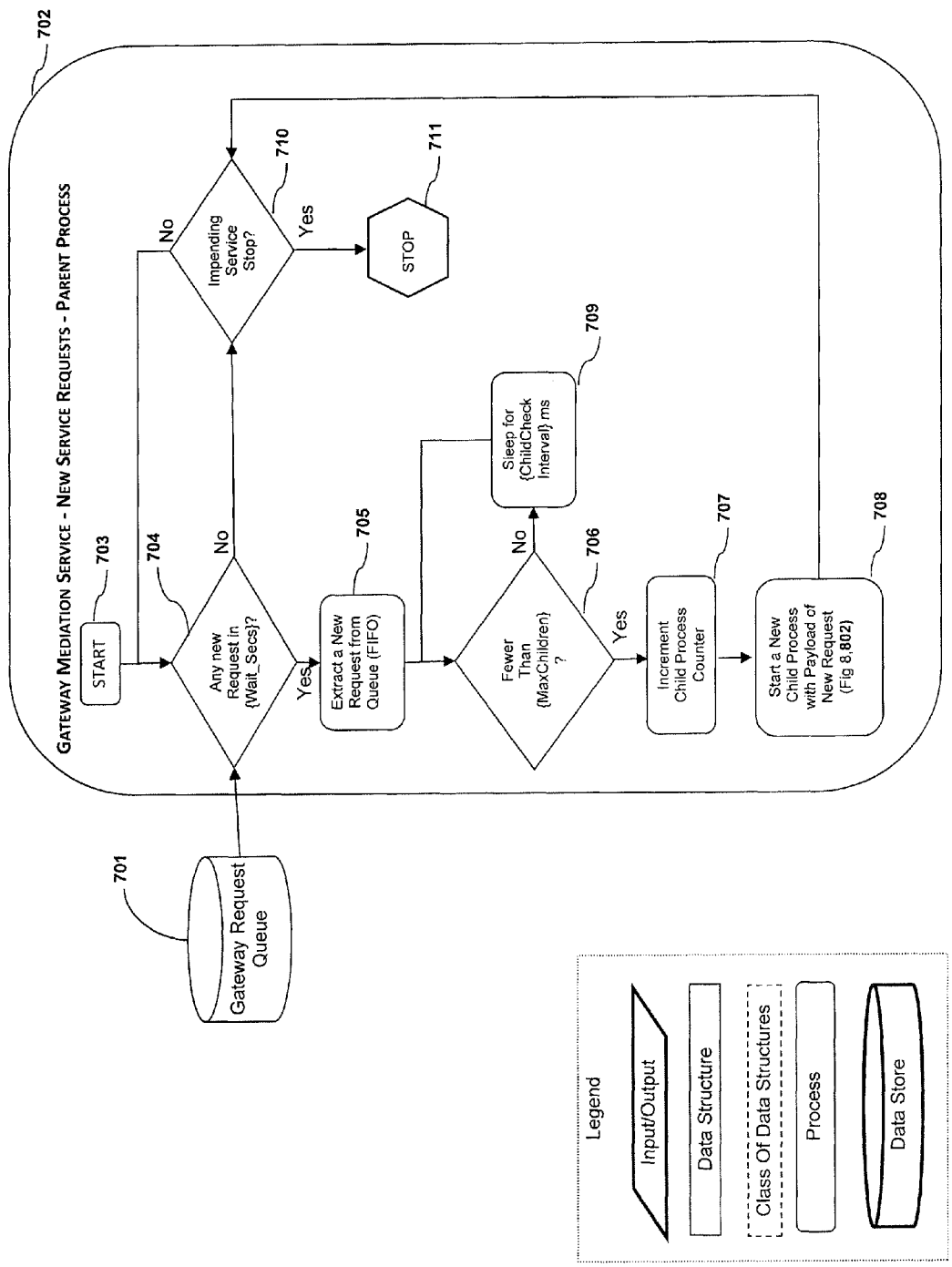
FIG. 7 illustrates a flow diagram of an embodiment of a parent process for new service requests to be sent.

FIG. 7 is a procedural flowchart showing the technique used by the gateway mediation service 702 to field and fulfill new service requests 701 via the off-net service providers' application gateway's web services in a manner which ensures that the host computer system is not overwhelmed by a large number of requests per unit time, by placing a limit on the number of concurrent child processes in 705. In order to minimize both the system load and the length of time a given request spends in queue 701, the gateway mediation new request parent process requires a memory-based queue that is able to notify the parent of new arrivals via a programmatic interrupt 704. The preferred embodiment for this invention is a Windows private event queue.

Figure 8:
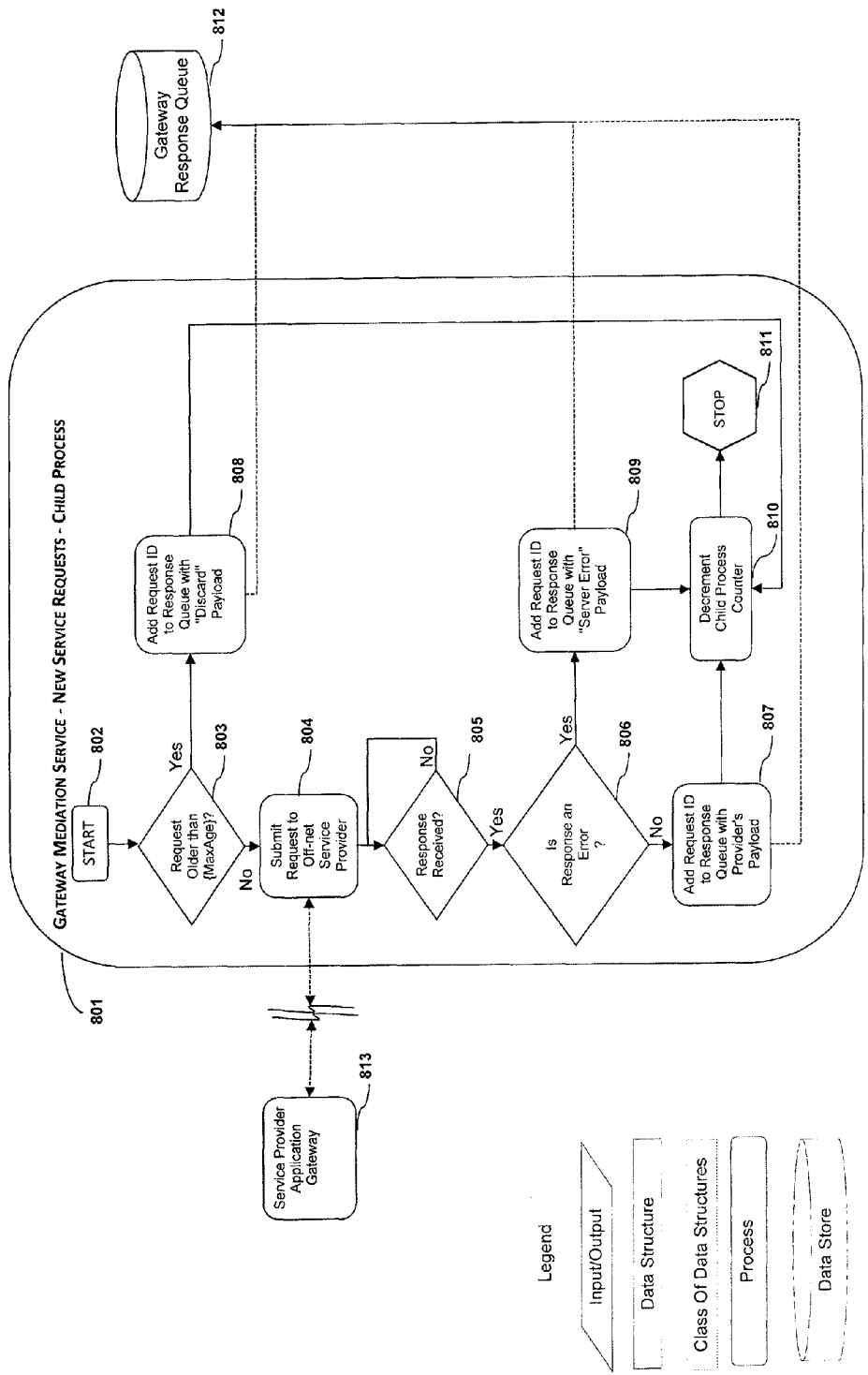
FIG. 8 illustrates a flow diagram of an embodiment of a child processes for new service requests.

FIG. 8 is a procedural flowchart showing the technique used by the gateway mediation service's child processes 801 to submit 804 to off-net service providers' gateways 813 SOAP-based web service requests comprised of XML messages containing the requestor's credentials and queries that conform to the syntax of the gateway's specific application programming interface, and to subsequently field the gateways' responses, e.g., XML messages containing wireless callers' latitudes and longitudes, in a manner which ensures that requests which experience a server or API error, will be discarded timely 806, and that requests will be skipped entirely if they are deemed too old 808.

Figure 9:
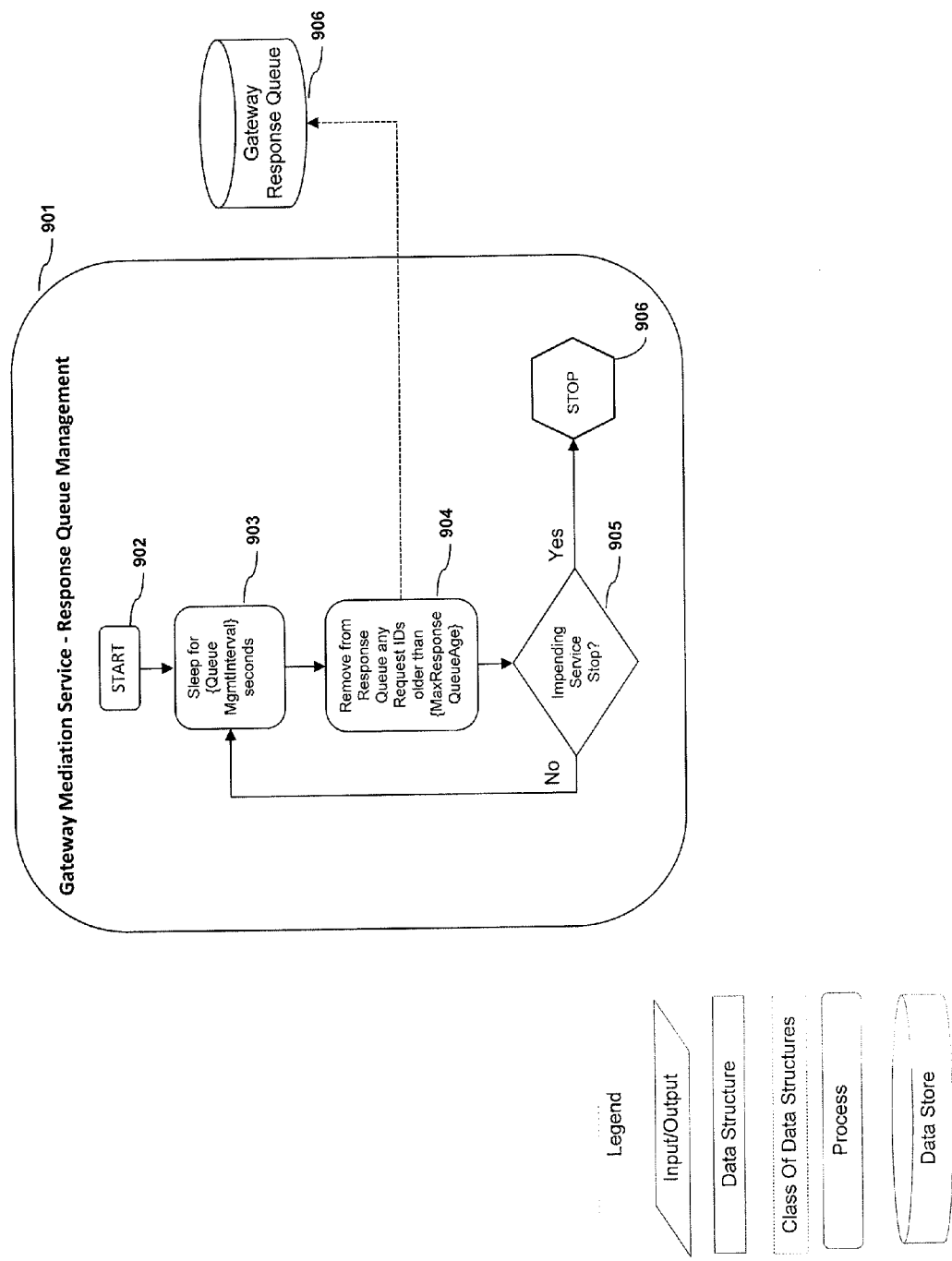
FIG. 9 illustrates a flow diagram of an embodiment of response queue management.

FIG. 9 is a procedural flowchart showing the technique used by the gateway mediation service's response queue management process 901 to remove entries from the response queue which were fulfilled too late to be useful in routing the call which triggered the request.

Figure 10:
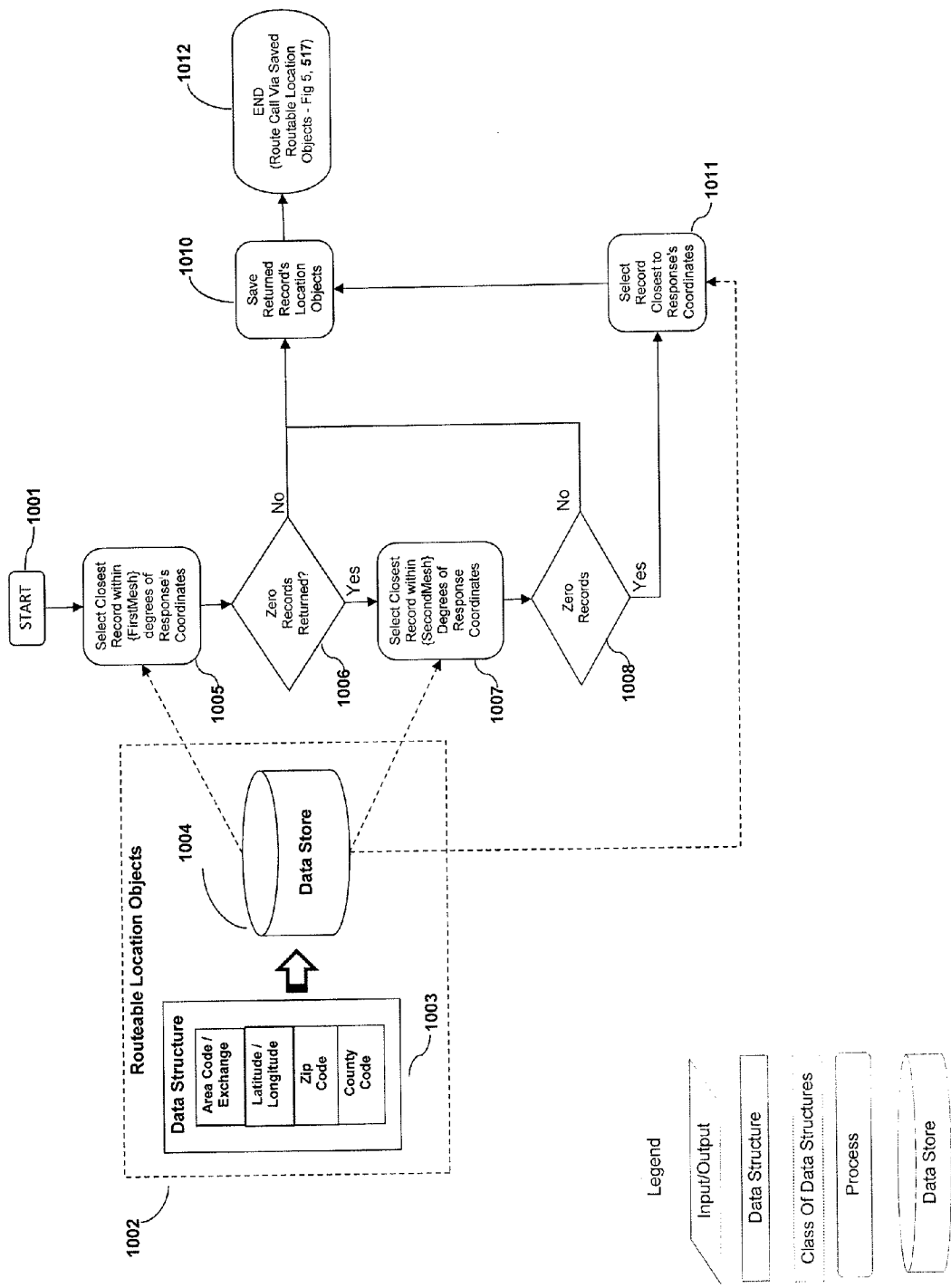
FIG. 10 illustrates a flow diagram of an embodiment for assigning to raw geographic data additional location data to route the incoming call.

FIG. 10 is a procedural flowchart showing the method for assigning to raw geographic coordinates, i.e., latitude and longitude of a given subscriber, additional location attributes which may be required to appropriately route a given telephone call. A table 1002 containing a plurality of records with attributes 1003 is placed in data store 1004 so that it can be read by the call routing service. Table 1002 contains one row for each unique pair of latitude and longitude coordinates associated with the "end offices" associated with the North American telecommunications network; other related location attributes can be added from any number of readily available commercial databases. The table 1002 is indexed on latitude and longitude, to optimize the speed with which distances may be queried 1005 and 1007.

In 1005, a query is issued to the on-net database server to a) compute the distances, using the standard formula from spherical geometry, between a caller's latitude and longitude coordinates and each record in table 1002 whose latitude and longitude attributes lie within {FirstMesh} degrees, e.g., one degree, b) sort the distances in ascending sequence, and c) return at most a single record. If at least one record is returned 1006, the related location attributes 1003 that pertain to that record are saved into memory 1010, for later use by the call routing service 520.

Otherwise, a second query is made, as above, but using a larger mesh {SecondMesh}, e.g., four degrees 1007. If at least one record is returned 1008, the related location attributes 1003 that pertain to that record are saved into memory 1010, for later use by the call routing service 520.

Otherwise, a third query is made 1011, as above, with no restriction on the records' latitudes and longitudes, the related location attributes 1003 that pertain to the row that is least distant are saved into memory 1010, for further later use by the call routing service 520.

The following will illustrate the manner in which the invention addresses the problem of interfacing an interactive voice response session, where callers are known to abandon calls at increasing rate as hold times rise, to a back-end web process with a wide and highly variable range of response times (it can take eight-sixteen seconds, or longer, to retrieve the caller's location). Since time is critical here, what is wanted is a technique which effectively decouples the two processes, allowing the call to route as soon as possible after the location has been received, and to route smoothly and quickly in case a response is not received in time.

For the purpose of this illustration, assume that the "On-Hold Sounds" table contains the rows shown on the below left, with the durations of each audio file's sound shown on the right:

| IDENTIFIER | AUDIO FILE POINTER | SEQUENCE # | SOUND DURATION |
|---|---|---|---|
| 1001 | 23001 | 1 | 3 seconds |
| 1001 | 23002 | 2 | 2 seconds |
| 1001 | 23003 | 3 | 1 second |
| 1001 | 23004 | 4 | 1 second |
| 1001 | 23005 | 5 | 1 second |

In this example, the process begins when a mobile subscriber who wants to order pizza dials 800-NEW-PIZZA (wanted number 800-639-7499), the inbound call is delivered to an IVR, and call routing services place a new request into the gateway request queue. All of these events usually occur within 2-5 seconds, during which the caller would hear silence; this amount of "post-dial delay" is typical of calls on the US telecommunications network.

The following table describes the experience of the caller thereafter, with the benefit of the subject invention, assuming that the off-net provider returns a response within eight seconds:

| | THE IVR DOES THE FOLLOWING... | TIME REQUIRED | AND THE CALLER HEARS... |
|---|---|---|---|
| 1. | Play a greeting to caller, per 509 | 6 seconds | "Thank you for calling 800-NEW-PIZZA. Please hold while we connect your call". |
| 2. | Check gateway response queue | 10 milliseconds | Silence |
| 3. | Play Seq #1 "on-hold" sound to the caller, per table specification 513 | 3 seconds | "On Hold" sound fragment - Sequence #1 |
| 4. | Check gateway response queue | 10 milliseconds | Silence |
| 5. | Route the call | | |

Without the subject invention, the IVR would have to wait a fixed and predetermined length of time for a response from the off-net service provider, calculated to be long enough that an acceptable proportion of new requests would typically be fulfilled by the provider, and all callers would be forced to wait on hold, for the same length of time, in order to garner the expected proportion of off-net provider responses. If the fixed wait time accounted for, say, 80% of responses, then by definition the majority of callers would be kept on hold, even though the IVR had already received a response. However, the subject invention allows the IVR to keep the caller's attention engaged by playing a seamless series of on-hold sound fragments, and to then route the call in close conjunction with the return response from the off-net service provider, which minimizes the time that callers spend on hold, and the associated abandon rate.

Further to the above example, if the off-net provider had required 6 seconds to return a response, the caller would not have heard any "on hold" sound fragments at all; the call would be routed, using the caller's coordinates, less than one second after the caller heard the greeting.

Further to the above example, if the off-net provider had required 12 seconds to return a response, the caller would have heard Sequence #1's 3-second "on hold" sound fragment, followed by Sequence #2's 2-second fragment and Sequence #3's 1-second fragments, before the call was routed using the caller's coordinates.

Further to the above example, if the off-net provider had required 30 seconds to return a response, the caller would have heard a Sequence #1's 3-second fragment, Sequence #2's 2-second fragment and Sequence #3, #4 and #5's 1-second fragments before the call was routed, via either an Operator 518 or via the location attributes of the caller's telephone number itself 516.

In accordance with various embodiments of the present invention, the methods described herein can be performed via operation of software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein may be optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission and wireless networking represent examples of the state of the art. Such standards are periodically superseded by faster or more efficient equivalents having essentially the same functions. Accordingly, replacement standards and protocols having the same functions are considered equivalents.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a usb key, a certificate, a perforated card, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer or a server, partly on the user's computer or a server, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Moreover, it is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A call routing system for routing calls based upon a calling party's location, the call routing system comprising:
    a communication interface structured and arranged to receive an incoming call;
    a routing network interface structured and arranged to route the incoming call to a termination point based upon a current location of the calling party;
    a location based service interface through which a query is transmitted over an Internet protocol based network to a service endpoint hosted by a server of a location based service provider to request location data associated with the current location of the calling party and through which a response including the location data is received from the location based service provider over the Internet protocol based network;
    a processor structured and arranged to execute instructions to route the incoming call to a closest termination point to the current location based on the location data; and
    a database storing a plurality of sounds and a processor that transmits at least some of the plurality of sounds to the calling party in a time period between the query transmission to and the response received from the location based service provider,
    wherein the incoming call does not originate over a land line device.

2. The call routing system in accordance with claim 1, further comprising an interactive call response unit structured and arranged to include the communication interface and the routing network interface.

3. The call routing system in accordance with claim 1, wherein the processor executes the plurality of sounds in a predetermined order for transmission to the calling party.

4. The call routing system in accordance with claim 1, wherein the query to be transmitted comprises a request identifier and a request payload.

5. The call routing system in accordance with claim 4, wherein the response received comprises the request identifier and a response payload.

6. The call routing system in accordance with claim 4, further comprising a gateway mediation service being coupled to the location based service interface and being configured to create a new service request for the query to be transmitted.

7. The call routing system in accordance with claim 6, wherein the new service request creates a child process which receives the response received from the location based service.

8. The call routing system in accordance with claim 1, wherein the location data comprises at least a latitude and longitude for the current location.

9. The call routing system in accordance with claim 8, wherein the instructions executed by the processor includes instructions to convert the latitude and longitude of the current location to at least one of: an area code and exchange; a zip code; and a county.

10. The call routing system in accordance with claim 1 being configured as an intermediary between the calling party and the termination point until the incoming call is ended.

11. The call routing system in accordance with claim 1, wherein the incoming call from the calling party is directed to a toll free number associated with an entity having multiple locations.

12. The call routing system in accordance with claim 1, wherein the incoming call originates from one of a cell phone, voice over IP system, or the Internet.

13. A method for routing calls based upon a calling party's location, the method comprising:
    receiving an incoming call from a calling party not originating from a land line device, the incoming call being directed to a number associated with a plurality of entities situated at different locations;
    determining a current location of the calling party through a request transmitted to a service endpoint hosted by a server of a location based service provider over an Internet protocol based network and a response from the location based service provider forwarding location data of the current location of the calling party;
    routing the incoming call for termination to a selected one of the plurality of entities which is situated closest to the current location; and
    at least during a period between the transmitting of the query and the receiving of the response, playing a plurality of sounds in a predetermined order to the calling party.

14. The method in accordance with claim 13, wherein the incoming call originates from one of a cell phone, voice over IP system or the Internet.

15. The method in accordance with claim 13, wherein the forwarded location data comprise data points in a coordinate system, and the method further comprises converting the data points to at least one of: an area code and exchange; a zip code; and a county.

16. The method in accordance with claim 13 being executed at least in part by a processor in a call routing system configured as an intermediary between the calling party and the termination point until the incoming call is ended.

17. A call routing system for routing calls based upon a calling party's location, the call routing system comprising:
    a communication interface structured and arranged to receive an incoming call;
    a routing network interface structured and arranged to route the incoming call to a termination point based upon a current location of the calling party;
    a location based service interface through which a query is transmitted to a location based service provider to request location data associated with the current location and through which a response including the location data is received from the location based service provider;

a processor structured and arranged to execute instructions to route the incoming call to a closest termination point to the current location based on the location data; and a database storing a plurality of sounds and a processor that transmits at least some of the plurality of sounds to the calling party in a time period between the query transmission to and the response received from the location based service provider, wherein the incoming call does not originate over a land line device.

18. The call routing system in accordance with claim 17, wherein the processor executes the plurality of sounds in a predetermined order for transmission to the calling party.

19. A method for routing calls based upon a calling party's location, the method comprising:

receiving an incoming call from a calling party not originating from a land line device, the incoming call being directed to a number associated with a plurality of entities situated at different locations;

determining a current location of the calling party by at least:
  transmitting a query to a location based service provider requesting location data for the current location; and
  receiving a response from the location based service provider that includes the location data for the current location;

routing the incoming call for termination to a selected one of the plurality of entities which is situated closest to the current location; and at least during a period between the transmitting of the query and the receiving of the response, playing a plurality of sounds in a predetermined order to the calling party.

* * * * *